(12) United States Patent
Ray et al.

(10) Patent No.: US 8,559,784 B2
(45) Date of Patent: Oct. 15, 2013

(54) MODULAR ASSEMBLY FOR SUPPORTING FIBER OPTIC SPLICES

(75) Inventors: Craig Dwayne Ray, Fuquay Varina, NC (US); Timothy W. Dexter, Raleigh, NC (US)

(73) Assignee: All Systems Broadband, Inc., Livermore, CA (US)

( * ) Notice: Subject to any disclaimer, the term of this patent is extended or adjusted under 35 U.S.C. 154(b) by 237 days.

(21) Appl. No.: 13/281,637

(22) Filed: Oct. 26, 2011

(65) Prior Publication Data

US 2013/0105420 A1    May 2, 2013

(51) Int. Cl.
*G02B 6/36* (2006.01)

(52) U.S. Cl.
USPC .......................................................... 385/135

(58) Field of Classification Search
USPC ................ 385/76, 95, 99, 134, 135; 439/527, 439/540.1, 942; 174/50, 59
See application file for complete search history.

(56) References Cited

U.S. PATENT DOCUMENTS

| | | | |
|---|---|---|---|
| 5,052,775 A * | 10/1991 | Bossard et al. .................. 385/76 |
| 5,285,515 A * | 2/1994 | Milanowski et al. ......... 385/135 |
| 5,311,612 A | 5/1994 | Vincent et al. | |
| 5,428,705 A * | 6/1995 | Hermsen et al. .............. 385/135 |
| 5,939,675 A | 8/1999 | DeFreitas | |
| 5,966,492 A | 10/1999 | Bechamps et al. | |
| 6,215,938 B1 | 4/2001 | Reitmeier et al. | |
| 6,240,236 B1 | 5/2001 | Daoud | |
| 6,795,633 B2 * | 9/2004 | Joseph, II ...................... 385/135 |
| 7,272,291 B2 * | 9/2007 | Bayazit et al. ................. 385/135 |
| 7,418,184 B1 * | 8/2008 | Gonzales et al. ............. 385/135 |
| 7,421,182 B2 * | 9/2008 | Bayazit et al. ................. 385/135 |
| 7,463,810 B2 * | 12/2008 | Bayazit et al. ................. 385/135 |
| 7,684,669 B2 * | 3/2010 | Bayazit et al. ................. 385/135 |
| 2002/0181922 A1 | 12/2002 | Xin et al. | |
| 2003/0202765 A1 * | 10/2003 | Franklin et al. ............... 385/135 |
| 2005/0123261 A1 * | 6/2005 | Bellekens et al. ............ 385/135 |
| 2007/0274662 A1 * | 11/2007 | Bayazit et al. ................. 385/135 |
| 2008/0226250 A1 * | 9/2008 | Gonzales et al. ............. 385/135 |
| 2009/0074371 A1 * | 3/2009 | Bayazit et al. ................. 385/135 |
| 2009/0238532 A1 * | 9/2009 | Smith et al. .................... 385/135 |
| 2010/0086267 A1 * | 4/2010 | Cooke et al. ................... 385/100 |
| 2011/0097053 A1 * | 4/2011 | Smith et al. .................... 385/135 |
| 2011/0116756 A1 * | 5/2011 | Vastmans ....................... 385/135 |
| 2011/0182558 A1 * | 7/2011 | Garcia et al. .................. 385/135 |
| 2011/0268414 A1 * | 11/2011 | Giraud et al. ................. 385/135 |
| 2011/0280535 A1 * | 11/2011 | Womack ........................ 385/135 |

* cited by examiner

*Primary Examiner* — Michael Safavi
(74) *Attorney, Agent, or Firm* — Murphy, Bilak & Homiller, PLLC

(57) ABSTRACT

A modular assembly for supporting fiber optic splices includes a tray, cradle, and splice holder. The tray includes a floor, a depression in the floor, and a tab that extends outward from a depression sidewall into the depression. The cradle includes a base configured to be seated in the depression. The cradle base has a first face positioned away from a bottom of the depression and an opposite second face positioned towards the depression bottom when the cradle base is seated in the depression. The cradle base also includes a shelf recessed into the first face at the first side of the cradle base, and positioned between the depression bottom and the tab when the cradle base is seated in the depression. A splice holder is mounted to the first face of the cradle base and defines a plurality of fiber optic splice slots positioned over the depression.

20 Claims, 18 Drawing Sheets

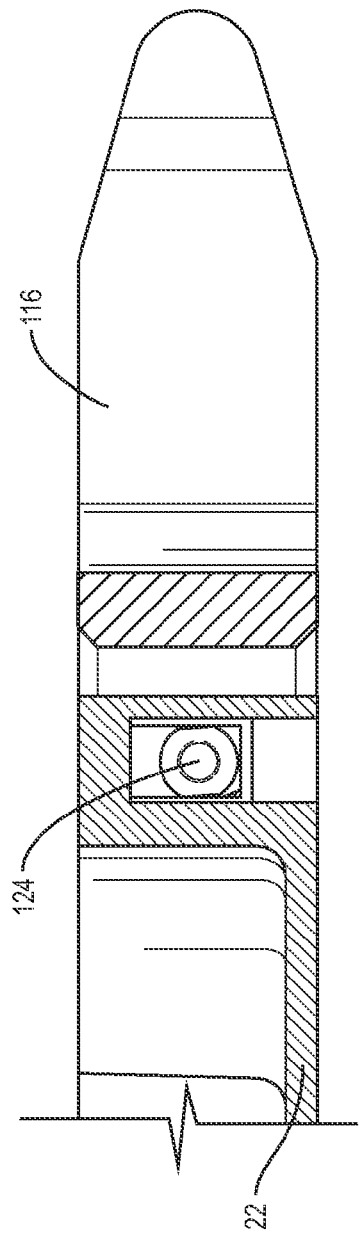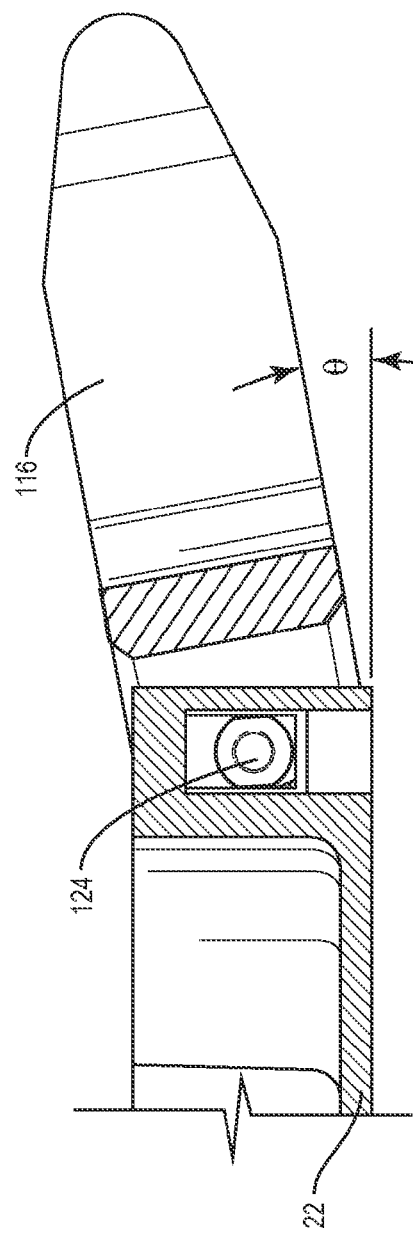
FIG. 13A
FIG. 13B

MODULAR ASSEMBLY FOR SUPPORTING FIBER OPTIC SPLICES

BACKGROUND

Fiber optic cables are increasingly being used as a transmission medium for communication systems. A fiber optic cable (or "fiber bundle") includes a number of smaller optical fibers, each of which may be used to transmit information such as voice or data using light signals. The individual fibers within a larger fiber bundle are very thin, and are susceptible to damage if mishandled, or if bent beyond a permissible bend radius. Prior art splicing trays have accounted for the permissible bend radius of individual fibers, but have nonetheless failed to prevent damage to fibers in certain configurations.

SUMMARY

According to one non-limiting embodiment, a modular assembly for supporting fiber optic splices includes a tray, a cradle, and a splice holder. The tray includes a floor, a depression in the floor that has sidewalls extending downward from an upper surface of the floor to a bottom of the depression, and a tab that extends outward from one of the depression sidewalls into the depression. The cradle includes a base configured to be seated in the depression. The cradle base has a first face positioned away from the bottom and an opposite second face positioned towards the bottom when the cradle base is seated in the depression. An area of the base is smaller than or equal to an area of the depression to enable the cradle base to be seated in the depression. The cradle base also includes a shelf recessed into the first face at the first side of the cradle base, and positioned between the bottom of the depression and the tab when the cradle base is seated in the depression. The splice holder is mounted to the first face of the cradle base and defines a plurality of slots, with each of the plurality of slots being positioned over the depression and being sized to receive fiber optic splices.

According to one non-limiting embodiment, a disclosed method secures a cradle for supporting fiber optic splices to a modular tray, with the cradle including a cradle base having first and second opposing faces and first and second opposing sides. According to the method, a first side of the cradle base is moved into a depression in a floor of the tray such that the first face of the cradle base is positioned away from a bottom of the depression and the second face of the cradle base is positioned towards the bottom of the depression. A shelf recessed into the first face at the first side of the cradle base is positioned between the bottom of the depression and a tab extending outward from a sidewall of the depression into the depression. The second side of the cradle base is moved into the depression such that the cradle base is positioned into the depression and is beneath the an upper surface of the floor of the tray, a protrusion extending from the second side of the cradle tray is received into a slot in a sidewall of the depression, and each of a plurality of axially aligned slots extending from the first face of the cradle base and are positioned over the depression.

Of course, the present invention is not limited to the above features. Indeed, those skilled in the art will recognize additional features and advantages upon reading the following detailed description, and upon viewing the accompanying drawings.

BRIEF DESCRIPTION OF THE DRAWINGS

FIGS. 13A-13B illustrate a range of rotation of the hinge.

DETAILED DESCRIPTION

Figure 1A:
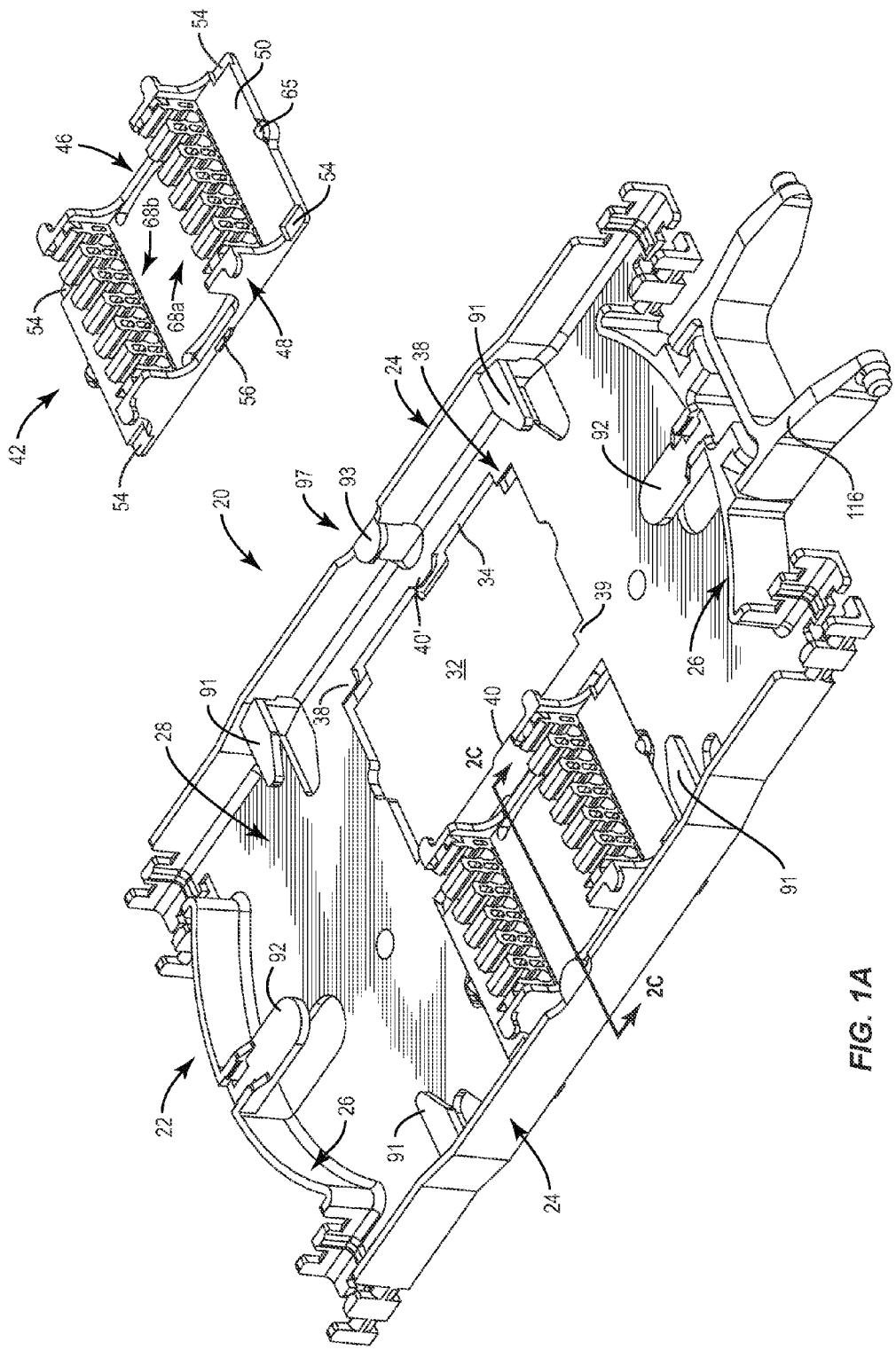
FIGS. 1A-1B illustrate an example modular assembly for supporting fiber optic splices.
Figure 1B:
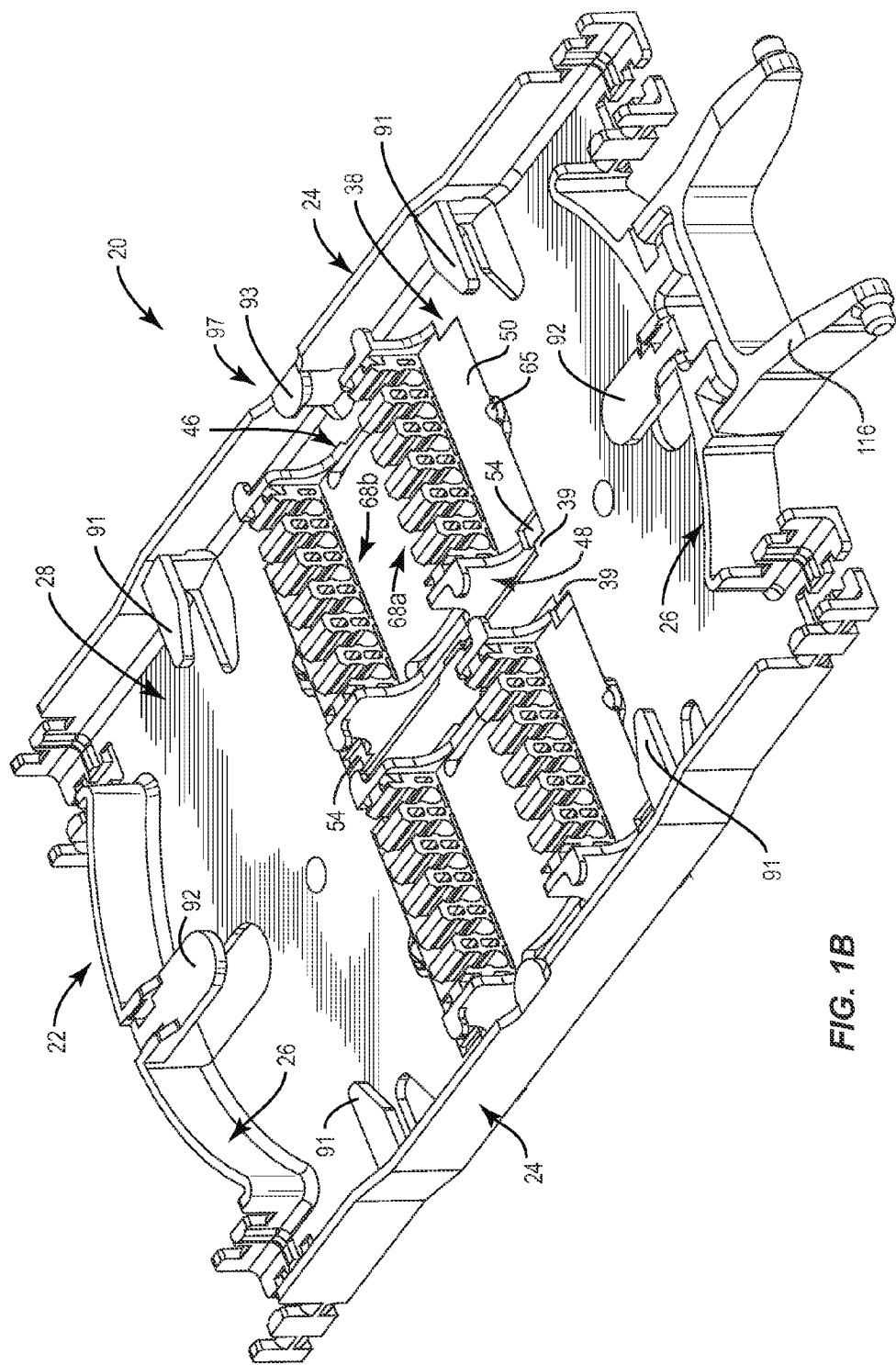

FIGS. 1a-b and 2a-c illustrate a modular assembly 20 for supporting fiber optic splices. The modular assembly 20 includes a tray 22, a cradle 42, and a plurality of splice holders 68. The tray receives 22 fiber bundles and facilitates winding of individual fibers of those bundles within channels inside the tray 22. The cradle 42 and splice holders 68 within the tray 22 support fiber optic splices that join fibers together. As will be described in greater detail below, the assembly 20 includes a variety of features to safely and efficiently store fibers while preventing damage to those fibers.

The tray 22 includes a floor 28, sidewalls 24, 26 that extend upward from the floor, and a depression 32 having its own sidewalls 34 that extend downward from an upper surface 30 of the floor 28 to a bottom 36 of the depression 32. At least one tab 38 that is spaced away from the bottom 36 of the depression 32 extends outward from one of the depression sidewalls 34 and into the depression 32. Optionally, at least one additional, smaller tab 39 may extend into the depression from an opposite side of the depression as the at least one tab 38.

Figure 2A:
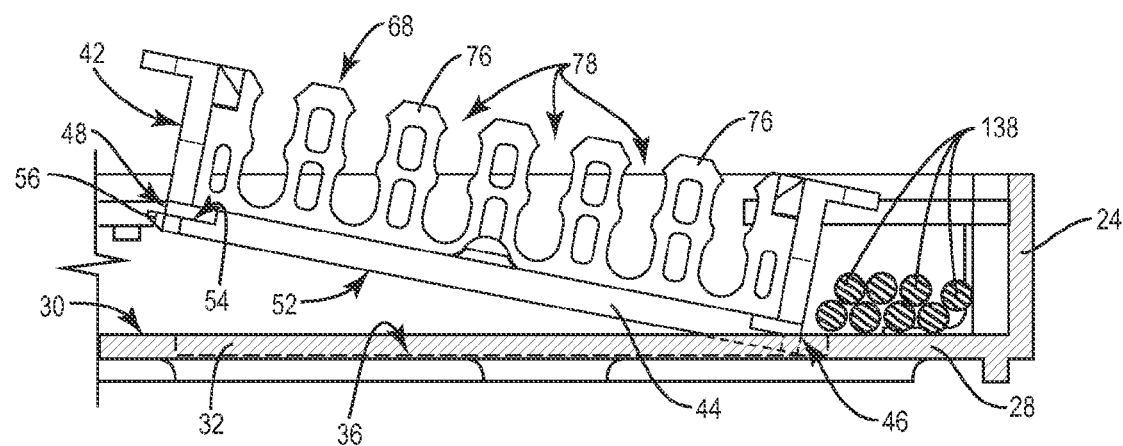
FIGS. 2A-2BC illustrate the insertion of a cradle into a tray of the modular assembly.
Figure 2B:
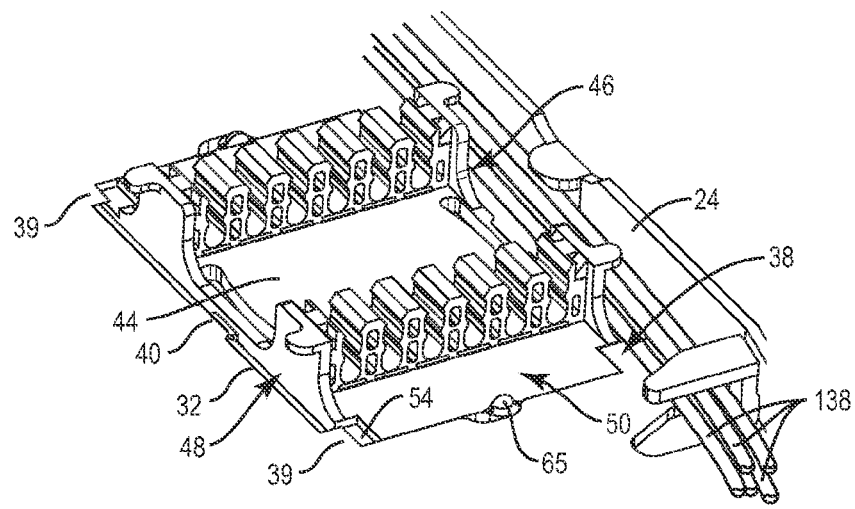
Figure 2C:
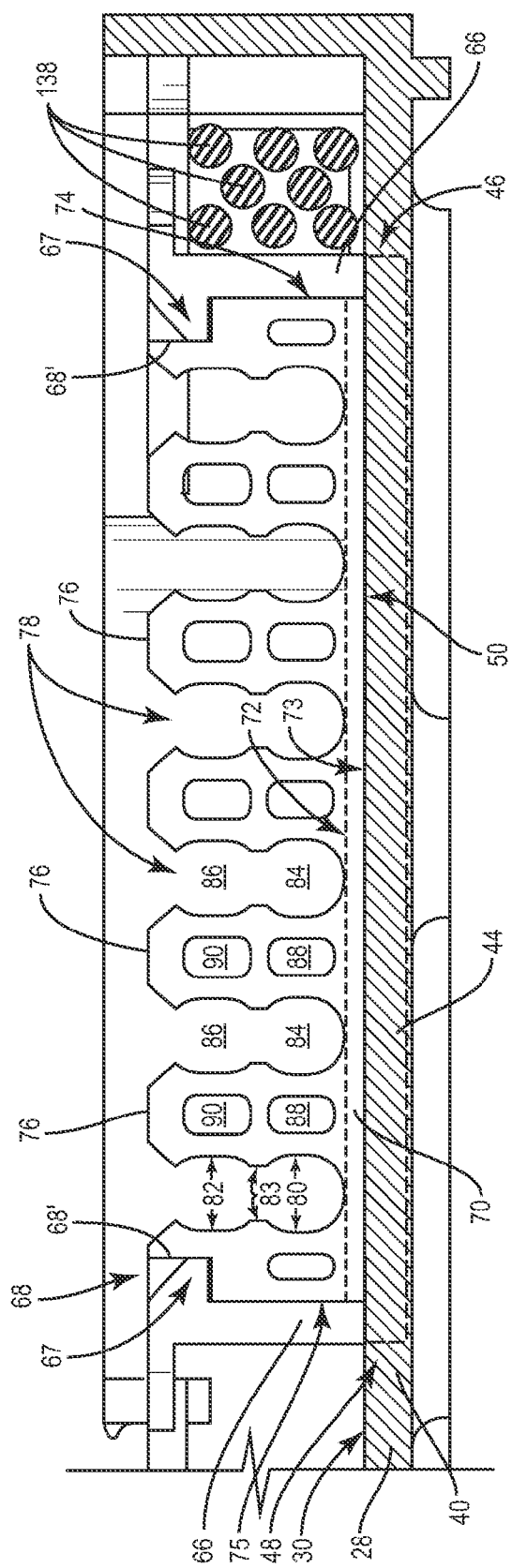

Referring to FIGS. 2a-c, the cradle 42 includes a base 44 configured to mount in the depression 32. An area of the cradle base 44 is smaller than or equal to an area of the depression 32 to enable the cradle base 44 to mount in the depression 32. The cradle base 44 has first and second opposing sides 46, 48 and also has a first face 50 positioned away from the bottom 36 of the depression 32 and an opposite second face 52 positioned towards the bottom 36 of the depression 32 when the cradle 42 is mounted in the depression 32.

The cradle base 42 includes at least one shelf 54 recessed into the first face 50 and positioned at least on the first side 46 of the cradle base 44, with the shelf 54 being positioned between the bottom 36 of the depression 32 and the tab 38 when the cradle base 42 is mounted in the depression 32. As shown in FIG. 1, the cradle base 44 may include the shelf 54 not only on both corners of the first side 46, but on both sides 46, 48 of the cradle base 44 at all four corners of the cradle base 44, with all four of the shelves 54 being positioned in the same depression 32.

When the cradle base 44 is mounted in the depression 32, the second face 52 of the cradle base 44 is flat and is parallel with the bottom 36 of the depression 32, and the first face 50 of the cradle base 44 is flush with or recessed below the upper surface 30 of the floor 28. In one or more embodiments, the cradle base 44 and the depression 32 are rectangular (see, e.g. FIGS. 1a-b). Also, in one or more embodiments, the first face 50 and the second face 52 of the cradle base 44 are parallel to each other, and are perpendicular to the sidewalls 24 of the tray 22.

Referring again to FIGS. 2a-c, by sliding the first side 46 of the cradle base 44 along the bottom 36 of the depression 32 to place the shelf 54 beneath the tab 38, fibers 138 can be safely moved away from the depression 32. This can advantageously avoid a situation that may otherwise be encountered if the shelf 54 and tab 38 were omitted, and both sides 46, 48 the cradle base 44 would be simultaneously pressed into the depression 32, which could damage fibers 138 extending over the depression 32.

Figure 3:
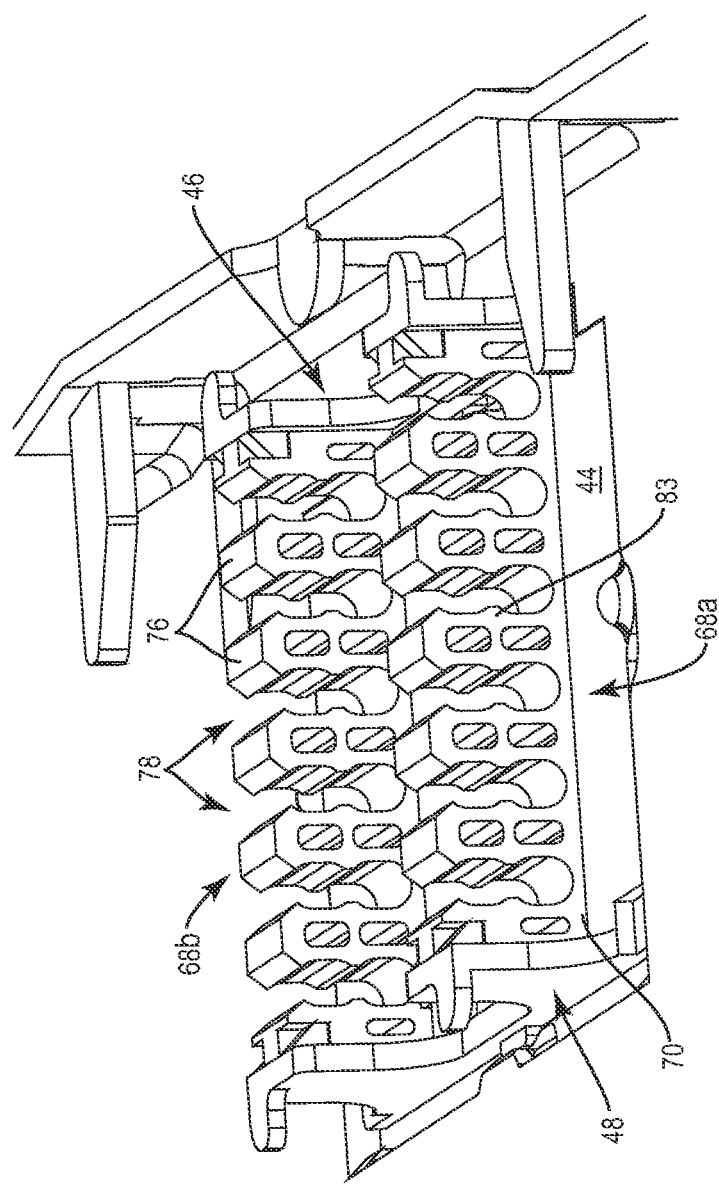
FIG. 3 illustrates an enlarged perspective view of two splice holders mounted to the cradle.

Referring to FIG. 2c and FIG. 3, at least one splice holder 68 is mounted to the first face 50 of the cradle base 44 and defines a plurality of slots 78. Each of the slots 78 is sized to receive fiber optic splices 140 connecting individual fibers 138 (see FIG. 4), and each of the slots 78 is positioned over the depression 32 when the cradle base 44 is mounted in the depression 32. The splice holder 68 includes a splice holder base 70 having a first face 72, and an opposite second face 73, with the first face 72 being positioned away from the first face 50 of the cradle base 44, and the second face 73 being positioned towards the first face 50 of the cradle base 44 (see FIG. 3). Each of a plurality of parallel spaced apart members 76 extends from the first face 72 of the splice holder 68 to define the plurality of slots 78 therebetween.

Each 76 member includes on at least one side a first concave groove 80 proximate to the splice holder base 70, and a second concave groove 82 spaced away from the slice holder base 70. The concave grooves 80, 82 are separated by a ridge 83 that is axially aligned with the grooves 80, 82.

Each of the plurality of slots 78 includes a first passage 84 defined by opposing first concave grooves 80, and a second passage 86 defined by opposing second concave grooves 82. Each of the passages 84, 86 is sized to receive a fiber optic splice 140, such that fiber optic splices 140 may be stacked within the slots 78 (e.g. one splice 140 in each passage 84, 86). A plurality of the members 76 of the splice holder 68 also include a first relief passage 88 adjacent to the first concave groove 80 on the at least one side of the member 76, and a second relief passage 90 adjacent to the second concave groove 86 on the at least one side of the member 76. As shown in FIG. 2c, this plurality includes all but the outermost members 76', which still include the first relief passage 88, but omit the second relief passage 90

Each of the relief passages 88, 90 are axially aligned with the grooves 80, 82. Also, each of the relief passages 88, 90 permit expansion of their adjacent first passage 84 or second passage 86 via lateral deformation of their respective adjacent first concave groove 80 or second concave groove 82, to improve retention of the splices 140 while minimizing movement of the members 76. Therefore, variations in splice sizes are permitted, as various sizes of splices can be secured in the slots 78 while minimizing the effect that movement of the members 76 from oversized splices would otherwise have on splices 140 stored in neighboring slots 78. Although the splice holder of 68 of FIG. 2c is illustrated as having six slots 78 for a total of twelve passages 84, 86, it is understood that this is only an example, and that other quantities of slots 78 and passages 84, 86 could be included in the splice holder 68.

FIG. 3 provides an enlarged perspective view of two splice holders 68a-b mounted to the cradle base 44. As shown in FIG. 3, the splice holders 68a-b define first and second columns of slots 78 that are horizontally spaced apart between the first and second sides of the cradle base 46, 48 and that are arranged in a parallel configuration so that the slots 78 of the first column (splice holder 68a) vertically align with the slots 78 of the second column (splice holder 68b) above the cradle base 44. In this configuration, a single fiber splice 140 may extend between the splice holders 68a-b to be supported by an aligned slot 78 in each of the holders 68a-b.

Each splice holder 68 is secured to the cradle base 44 via a snap-in feature provided by arms 66 that extend upwards from the first face 50 of the cradle base 44 at the first side 46 and second side 48 of the cradle base 44. Each arm 66 includes a cradle tab 67, with the tabs 67 extending towards each other over the cradle base 44 (see FIG. 2c). Each splice holder 68 is positioned between the 66 arms so that each cradle tab 67 extends into an opposite side of the splice holder 68 to mount the splice holder 68 to the first face 50 of the cradle base 44. As shown in FIGS. 1 and 3, the cradle 42 may include four arms 66 and four corresponding cradle tabs 67 to mount the separate splice holders 68a-c to the cradle base 44.

Figure 5:
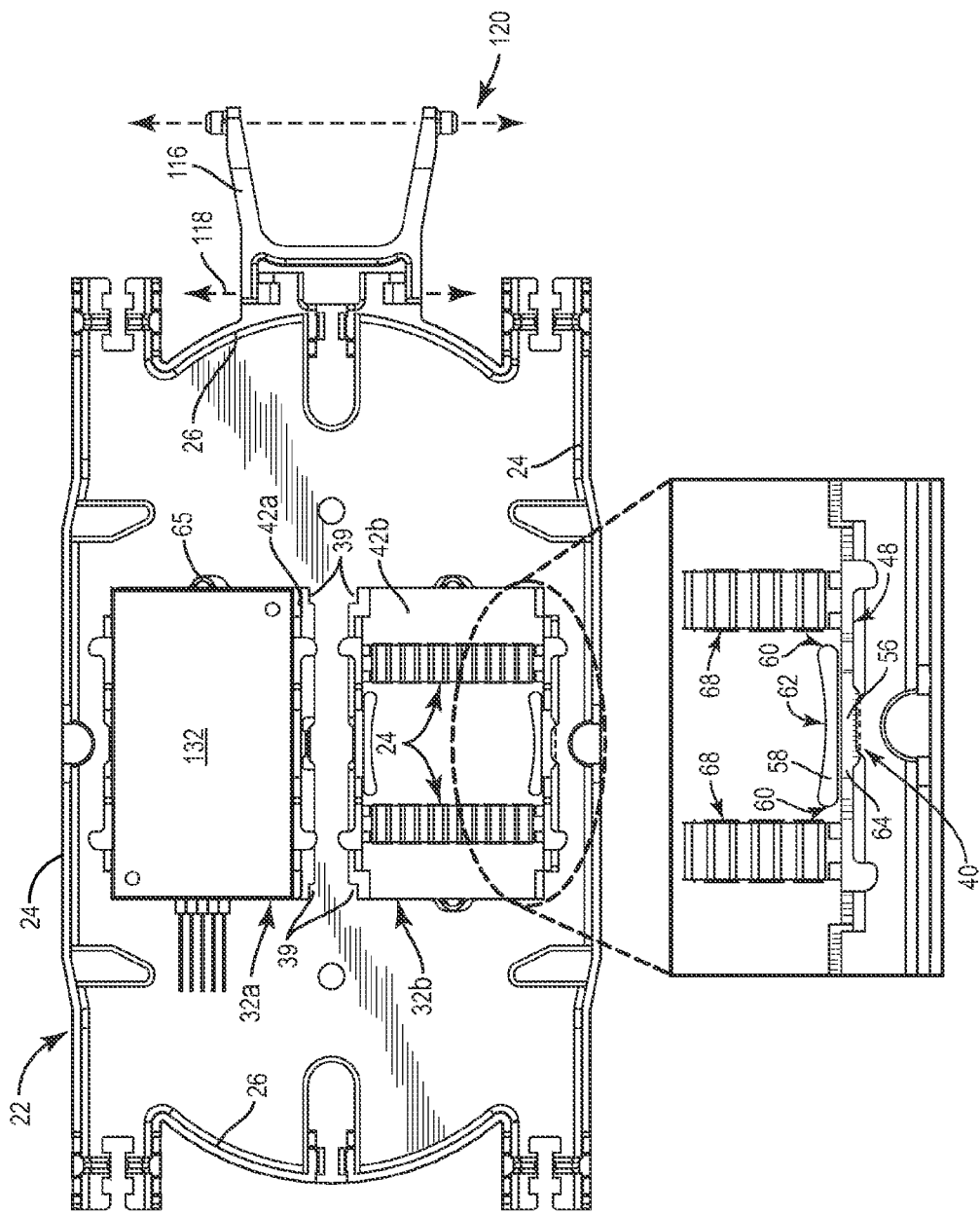
FIGS. 5 and 5A illustrate additional views of the modular assembly.

Referring now to FIG. 5, the cradle 42 includes a protrusion 56 that extends outward from the second side 48 of the cradle base 44. The protrusion 56 is positioned beneath a lip 40 extending over the depression 32 when the cradle base 44 is mounted in the depression 32 (see FIGS. 2b, 5). Thus, the cradle base 44 is mounted in the depression 32 on the first side 46 by the shelf 54 and tab 38, and on the second side 48 by the protrusion 56. In one or more embodiments the cradle base 44 may also include the protrusion 56 on the first side 46 of the cradle base, and that additional protrusion may be secured beneath an additional lip 40' (see, e.g. FIG. 1a).

A passage 58 extends between the first face 50 and second face 52 of the cradle base 44 along the second side 48 of the cradle base 44. A portion 64 of the cradle base 44 between the protrusion 56 and the passage 58 is able to flex to bias the protrusion 56 away from the lip 40 to facilitate removal of the cradle 42 from the depression 32. The passage 58 has an elongated profile including rounded ends 60 and a narrowed center portion 62 that permits flexing of the portion 64 of the cradle base 44. A large radius may be selected for the rounded ends 60 to reduce stress on the portion 64 of the cradle 42, and to permit a desired amount of flexing. As shown in FIGS. 1 and 5, the passage 58, protrusion 56 and the shelves 54 may be included at both sides 46, 48 of the cradle base 44 so that the cradle base 44 may be mounted in the depression 32 in multiple orientations (e.g. each 180° rotationally different from each other), and is not limited to mounting in a single orientation.

Figure 6:
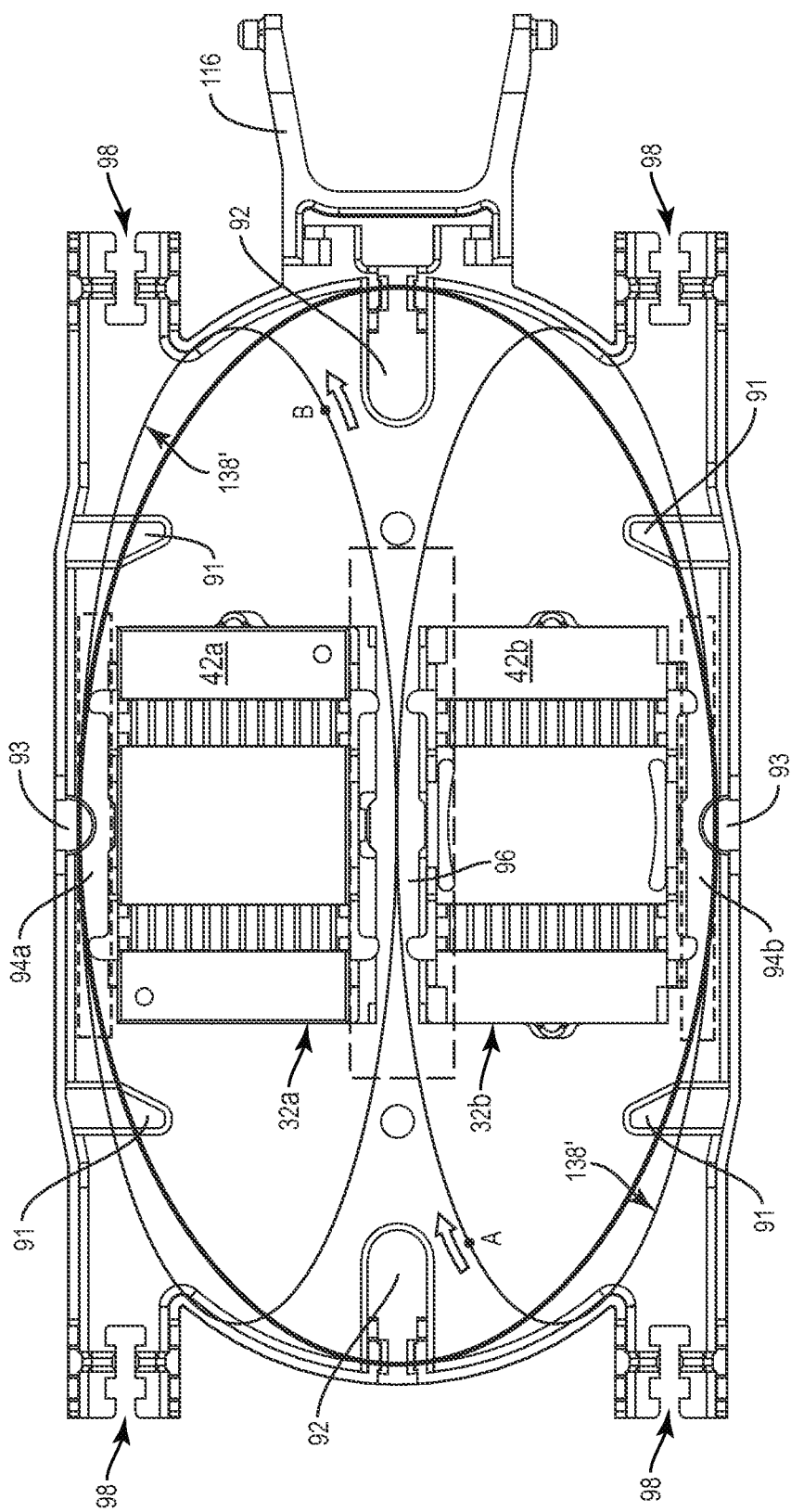
FIG. 6 illustrates a plurality of fiber channels within the tray.

FIG. 5 also illustrates an example of how the modular assembly 20 for supporting fiber optic splices 140 is modular. As shown in FIG. 5, the tray 22 may include a plurality of depressions 32a-b, with a cradle 42 mounted in each depression 32a-b, and with a splice holder 68 being mounted to a cradle 42b in one of the depressions 32b, and another fiber optic component, such as a demodulator 132, being mounted to a cradle 42a in another of the depressions 32a. Alternatively, both depressions 32a-b may include splice holders 68 mounted to cradles 42, as shown in FIG. 6. In one or more embodiments, the first cradle 42a and the first depression 32a have substantially identical shapes and sizes to the second cradle 42b and the second depression 32b respectively. In one example, the demodulator 132 is also configured to snap into the depression 32 via the cradle arms 66, such that the cradle arms 66 abut a top of the demodulator 132. Upward extensions 65 on either side of the cradle base 42 may be used to abut the sides of the demodulator 132 to prevent the demodulator 132 from sliding out of the cradle 42.

Figure 5A:
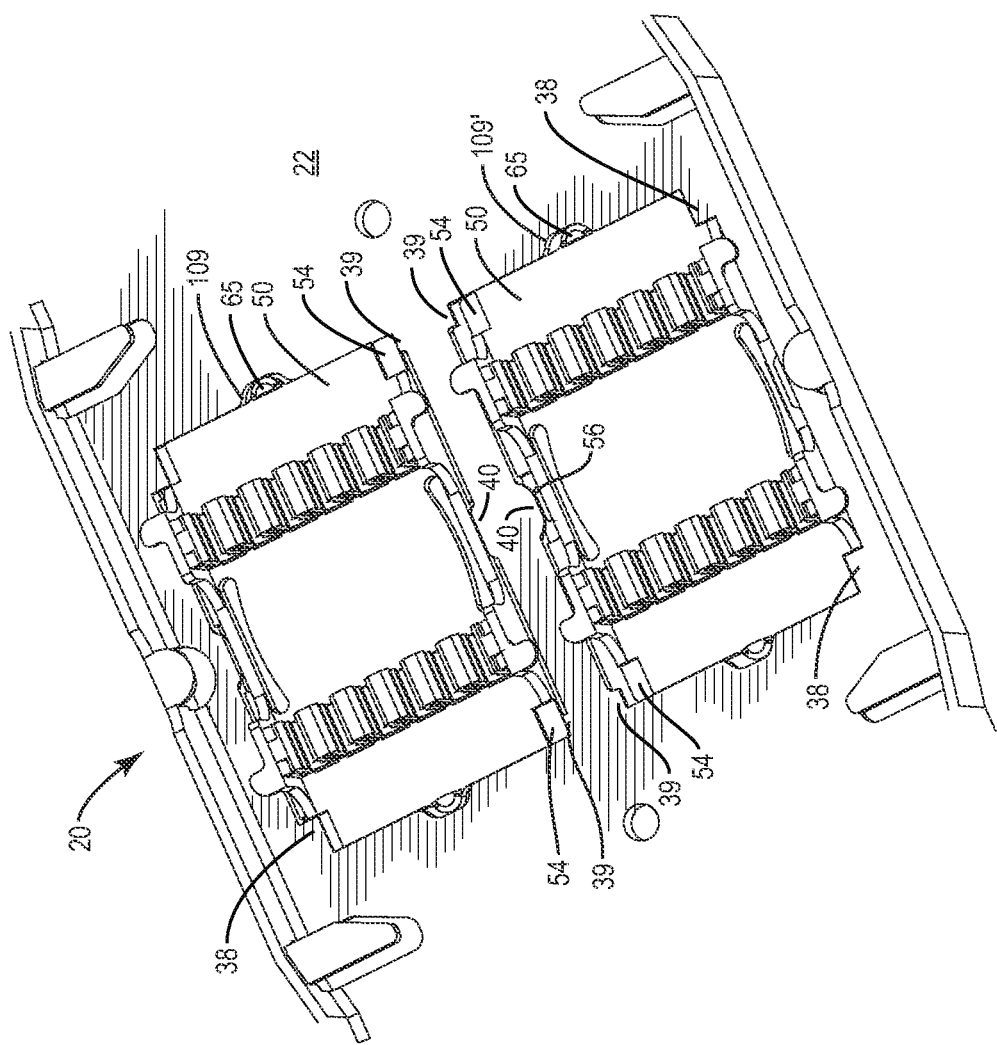

FIG. 5a illustrates another view of a portion of the modular assembly 20. As shown in FIG. 5a, the tray 22 may include one or more additional tabs 39 that are smaller than the tabs 38, and that extend over the depression 32 from an opposite side as compared to the tabs 38. In one or more embodiments, the tray 22 may include the tabs 39 at the corners of one side of the depression 32, and may include the smaller tabs 39 at the corners of the opposite side of the depression 32. The additional tabs 39 may be used extend over shelves 52 of the cradle base 44 when the cradle base is secured in the depression 32.

As shown in FIG. 5a, the cradle base 44 may be permitted a limited range of movement within the depression 32. For example, the portion of the cradle base 44 from which the upward extension 65 extends is seated in an inlet portion 109 of the depression 32. In one example, the cradle base 44 is may be biased towards the middle of the depression 32 in a resting position (and the upward extension 65 towards a middle of the inlet 109) via the lip 40, 40' on either side of the depression. However, a user may push the cradle 42 closer to or further away from its neighboring depression 32 (see inlet 109' of FIG. 5a) to move one or more shelves 54 of the cradle 42 out from under the smaller tabs 39, and to facilitate removal of the cradle 42 from the depression 32.

Referring to FIG. 6, the cradles 32 may be arranged to form channels 94a-b, 96 within the tray 22. Channel 94a is provided between a first sidewall 24a of the tray 22 and the first cradle 32a, channel 94b is provided between an opposite second sidewall 24b of the tray 22 and the second cradle 32b, and channel 96 is provided between the cradles 32a-b. The channels 94a-b, 96 act as winding paths for fiber bundles 137 and individual fibers 138. Channel 96 in particular may be used to facilitate changes in direction of fiber winding. For example, at point "A" a fiber 138' is winding clockwise within the tray 22, and at point "B" (after traversing the channel 96), the fiber 138' is winding counter-clockwise within the tray 22.

Referring to FIGS. 1 and 6, in addition to including tabs 38 that extend outward from the depression sidewalls 34 into the depression 32, the tray 22 also includes additional tabs 91-93 that extend inwards from the sidewalls 24, 26 of the tray 22. The tabs 91 and 93 extend inwards from the sidewalls 24, and the tabs 92 extend inwards from the sidewalls 26. The tabs 91-93 may be sued to advantageously retain fibers 138 safely within the tray 22, and prevent those fibers 138 from extending above the sidewalls 24, 26 of the tray 22 and outside of the tray 22, where the fibers 138 may become damaged.

Additionally, as shown in FIG. 1a, a portion of the sidewall 24 adjacent to the tab 93 may include a recess 97 that can be used for placing fibers 138 under the tab 93. A user could slide their finger from outside of the tray 22 across the recess 97 and the tab 93 towards the cradle 42 to push fibers inwards, and then could push those fibers downwards safely beneath the tab 93.

Figure 4:
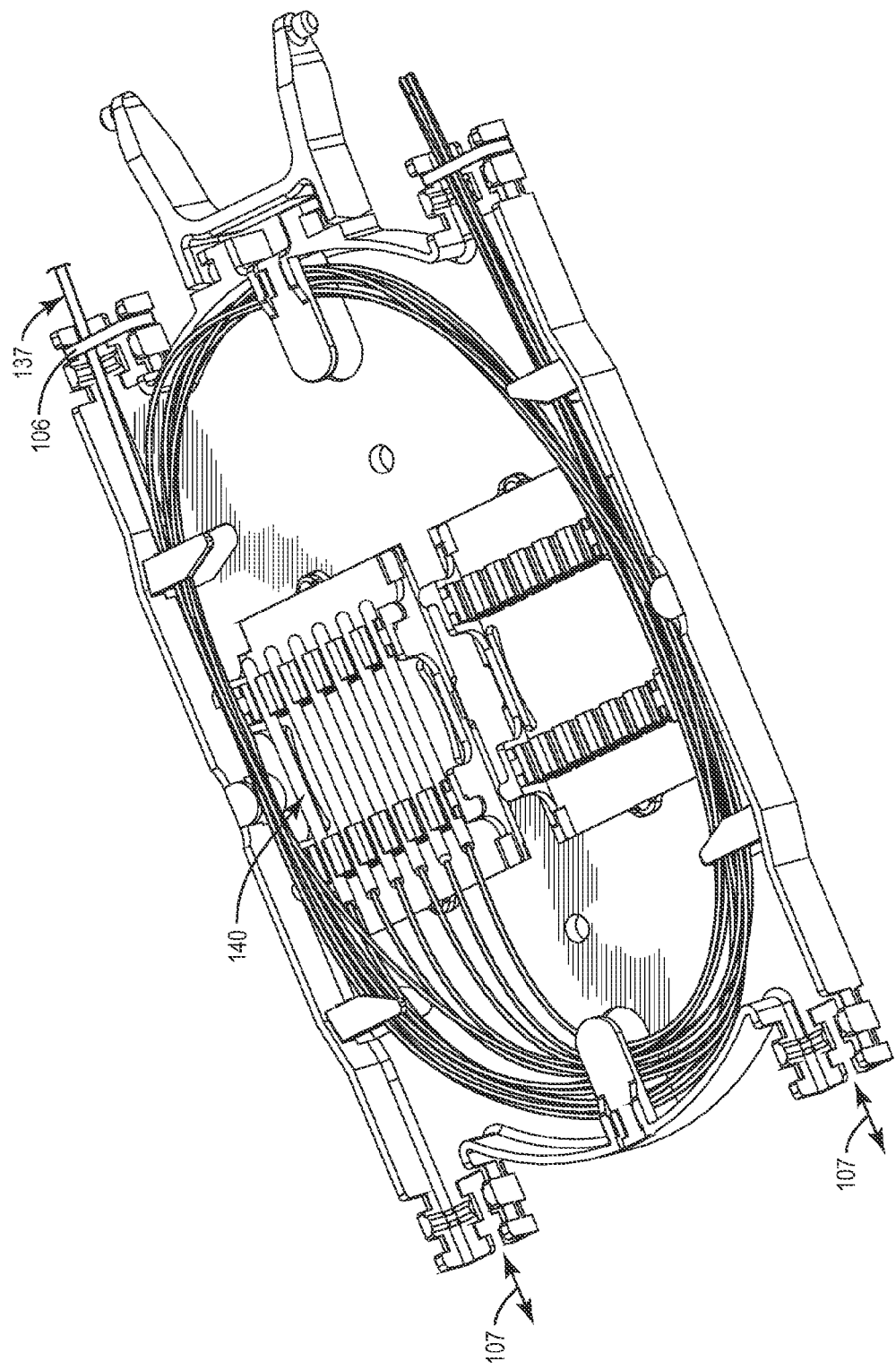
FIG. 4 illustrates a plurality of fiber optic splices within the tray of the modular assembly.
Figure 7:
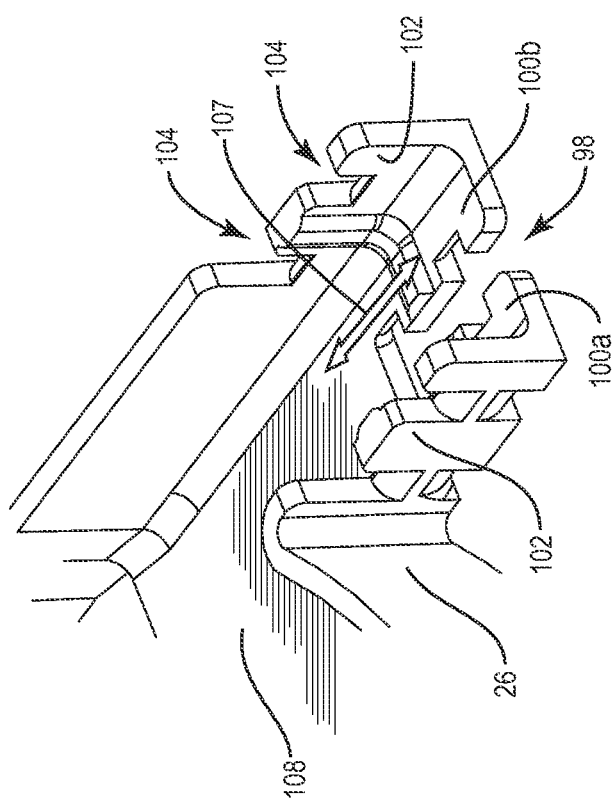
FIG. 7 illustrates a neck for securing fibers extending out from the modular assembly.

Referring to FIGS. 4 and 7, the tray 22 also includes a neck 98 that facilitates the securing of fiber bundles 137 and/or individual fibers 138 to the tray 22 using cable ties 106 (or any other desired circular fastener). The neck 98 extends outwards from one of the curved sidewalls 26 of the tray 22, and is defined by a neck base 100 and opposing neck sidewalls 102 extending upwards from the neck base 100. The neck 98 defines a channel 107 that is in communication with a central section 108 of the tray 22 defined by the floor 28 and sidewalls 24, 26 of the tray 22. The neck sidewalls 102 include notches 104 that are sized to receive a surrounding fastener (e.g. a cable tie 106) for securing fibers 138 or fiber bundles 137 extending from the central section 108 through the channel 107 of the neck 98. As shown in FIGS. 4 and 7, the base 100 of the neck 98 may be separated into two sections 100a-b to facilitate securing of separate cable ties 106 to each sidewall 102. Also, as shown FIG. 6, the tray 22 may include a neck 98 at each of its four corners.

Figure 8:
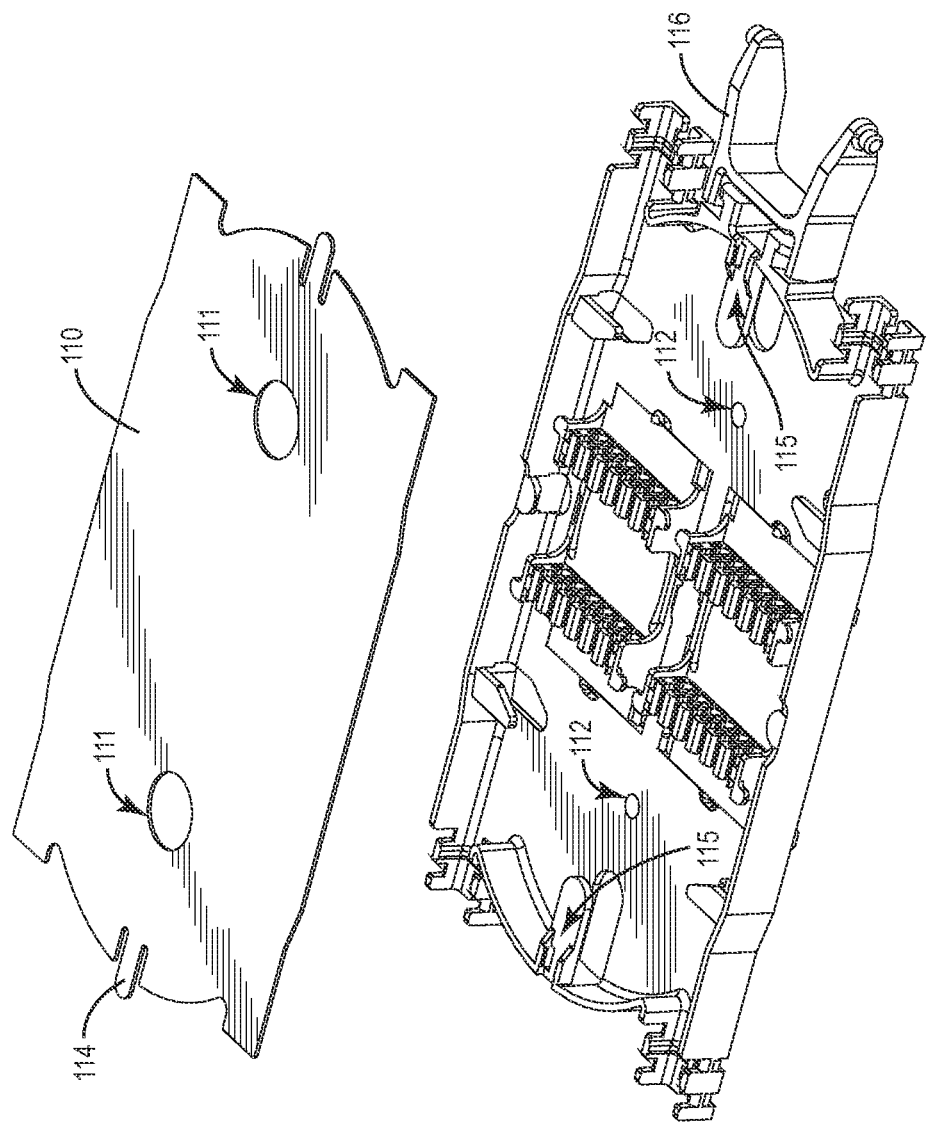
FIGS. 8-9 illustrate a lid for the modular assembly.
Figure 9:
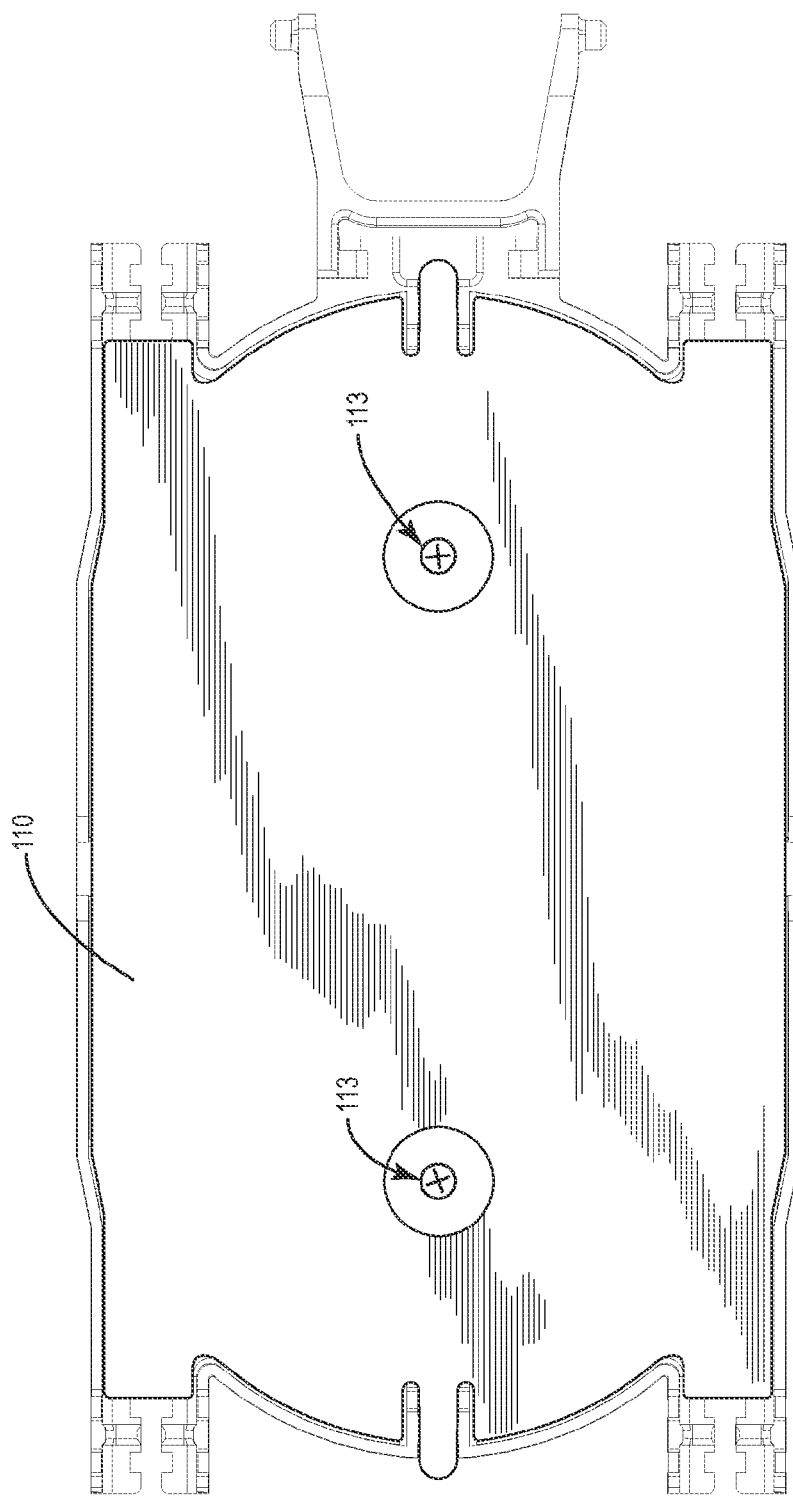

FIGS. 8-9 illustrate a flexible lid 110 for the modular assembly 20. The lid includes holes 111 that align with holes 112 in the tray 22. As shown in FIG. 10, a fastener 113 may be received through a washer into the hole 111 in the lid 110, and through hole 112 in the tray 22 to secure the lid 110 and the tray 22 to a desired surface. The lid 110 also includes tongues 114 that are sized to fit in receptacles 115 on tabs 92. In one example, a user may place a finger in each hole 111 in the lid 110 to flex the lid 110 so that the tongues 114 can be inserted into the receptacles 115 to secure the lid 110 to the tray 22.

Figure 10A:
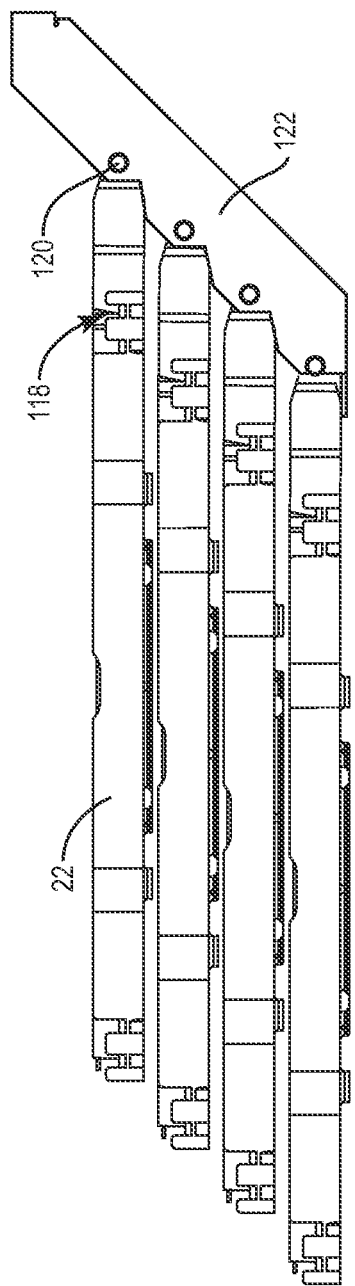
FIGS. 10A-10B illustrate a hinge for securing the modular assembly to a frame.
Figure 10B:
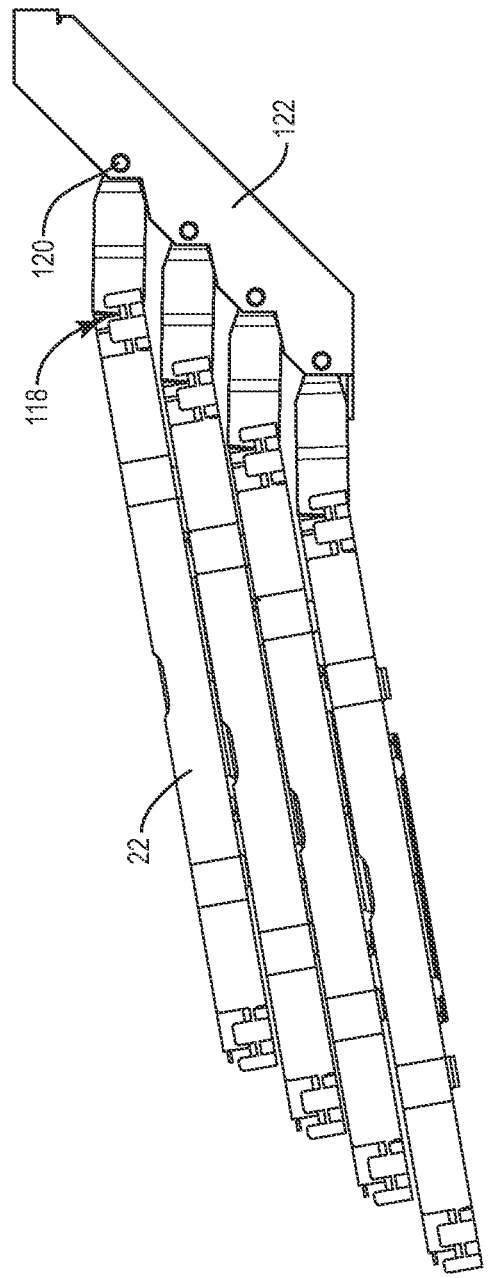

In one or more embodiments, a hinge 116 is attached to one of the curved sidewalls 26 of the tray 22, with the hinge defining two spaced apart and parallel hinge axes 118, 120 (see, e.g., FIG. 5). Referring now to FIGS. 10a-b, a plurality of the trays 22 may be secured to a frame 122 via their respective hinges 116. This can advantageously enable a user to safely store many fiber splices 140 in close proximity to each other in an organized fashion within each tray 22, and further contributes to the modular nature of the assembly 20 (and the tray 22 within each assembly 20). As shown in FIGS. 10a-b, the tray 22 is configured to pivot with respect to the hinge 116 about a first of the two axes (axis 118), and the hinge 116 is configured to pivot with respect to the tray about a second of the two axes (axis 120).

Figure 11:
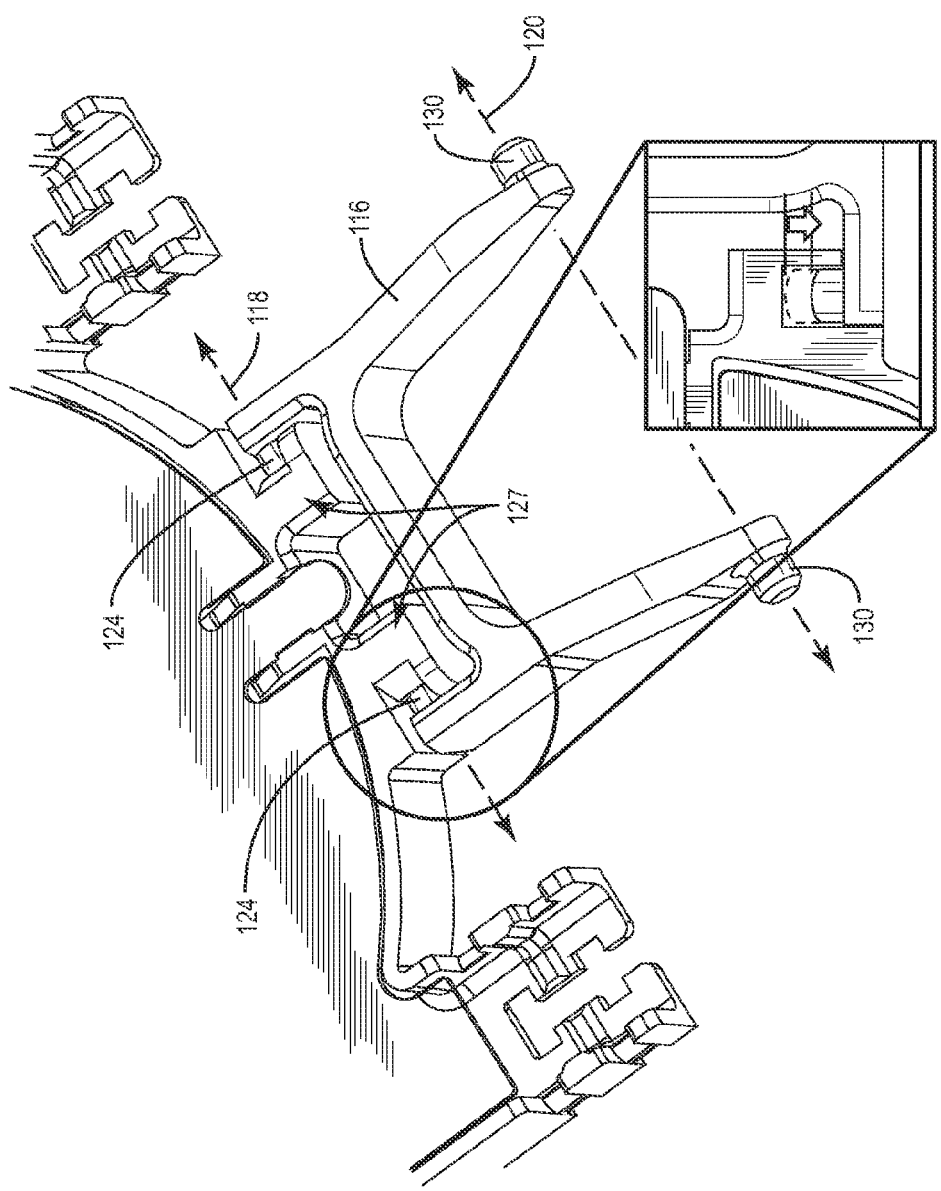
FIGS. 11-12 illustrate an example configuration for mounting the hinge to the tray.
Figure 12:
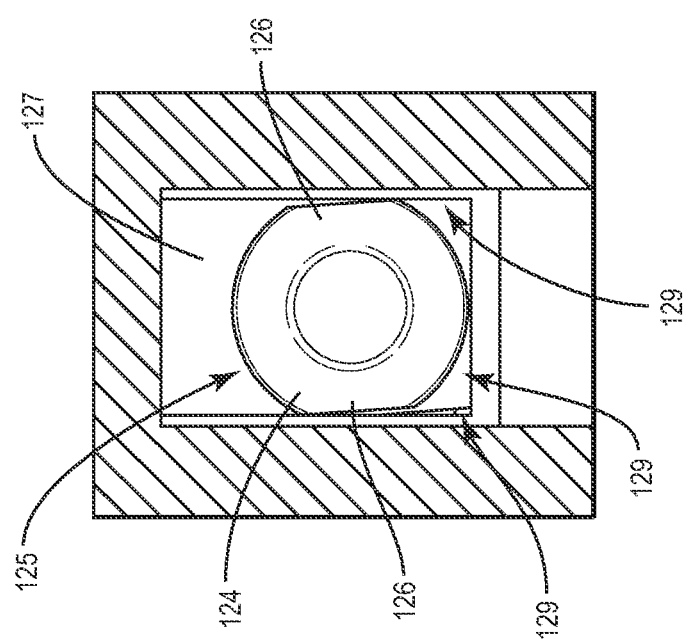

FIGS. 11-12 illustrate an example configuration for mounting the hinge 116 to the tray 22, for rotation about the first axis 118. As shown in FIG. 11, the hinge 116 includes inward-facing generally cylindrical extensions 124 that extend along the first axis 118 and are received into openings 128 in a mounting portion 127 of the tray. Referring to FIG. 12, each cylindrical extension 124 includes opposing rounded sections 125 adjacent to opposing straight sections 126. The straight sections 126 abut opposing walls 129 of the openings 128 on opposite sides of the openings 128 to define a range of rotation about the first axis 118. The hinge 116 also includes outward-facing extensions 130 that extend along the second axis 120 to facilitate rotation of the hinge 116 about the second axis 120. FIGS. 13a-b illustrate a range of rotation of the hinge 16 about the first axis 118. As shown in the example of FIGS. 13a-b, from a non-rotational position (see FIG. 13a), the tray 22 may rotate about the axis 118 by an angle θ in either direction (see FIG. 13b).

Figure 14:
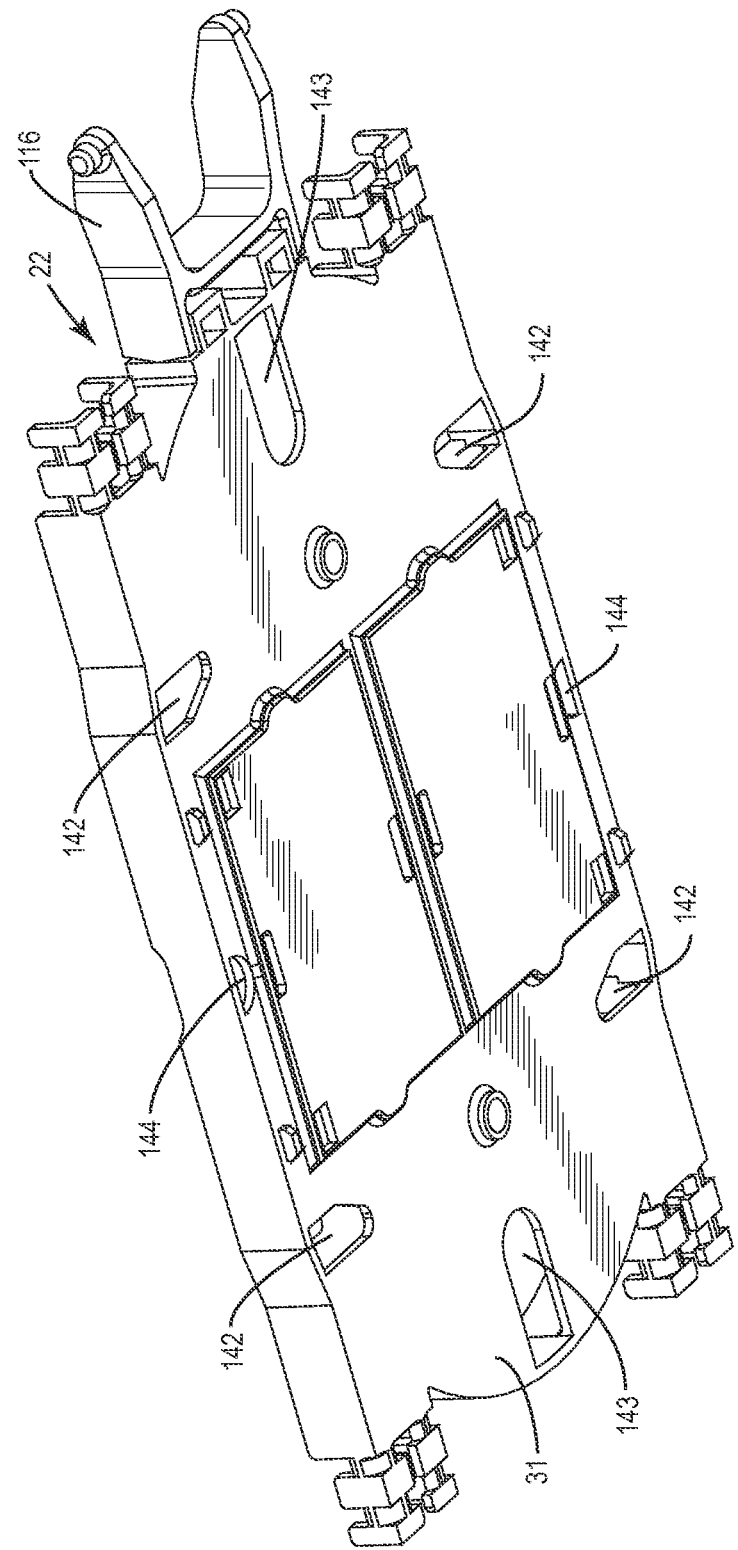
FIG. 14 illustrates a bottom of the tray of the modular assembly.

FIG. 14 illustrates a bottom surface 31 of the floor 28 of the tray 22 of the modular assembly 20. As shown in FIG. 14, the tray 22 may include a plurality of openings 142, 143, 144 to assist in the formation of the tabs 91, 92, 93 respectively. For example, during manufacture of the tray 22, a tool may extend through the openings 142, 143, 144 to abut a bottom of the tabs 38, 92, 93.

Figure 15:
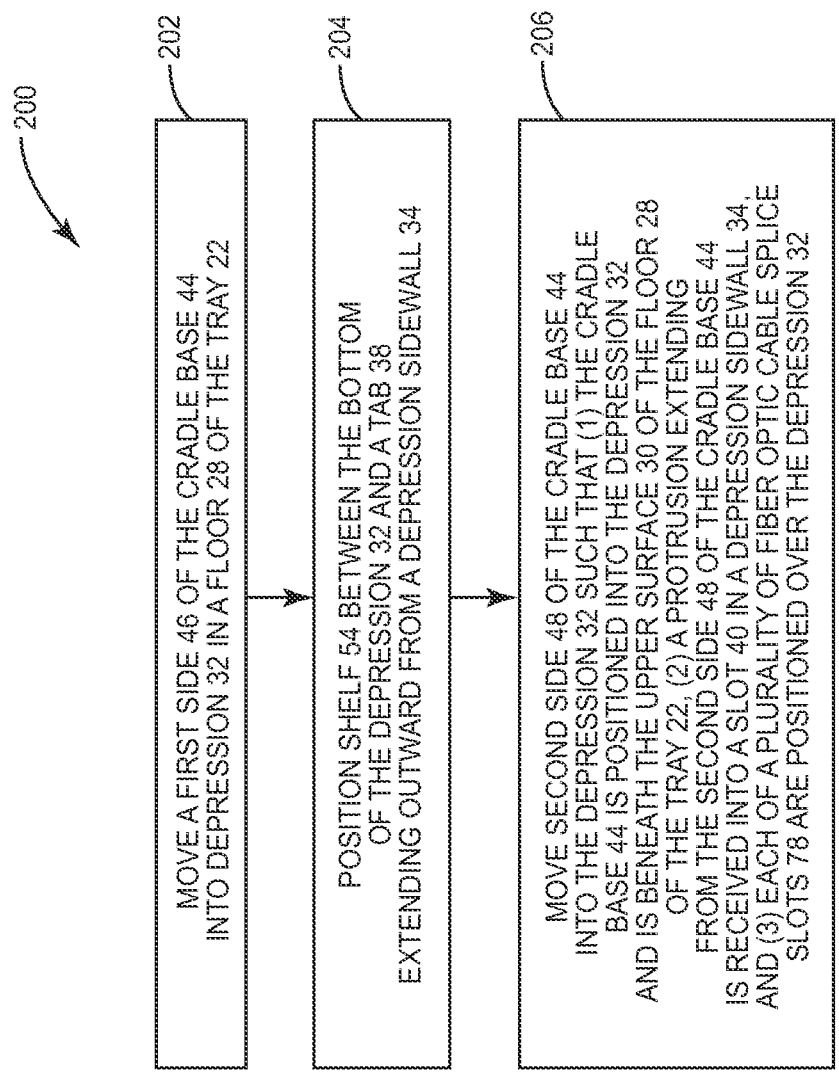
FIG. 15 is a flow chart of a method of securing the cradle to the tray.

FIG. 15 is a flow chart of a method 200 of securing the cradle 42 to the tray 22. In a first step, the first side 46 of the cradle base 44 is moved into the depression 32 in the floor 28 of the tray 22, such that the first face 50 of the cradle base 44 is positioned away from the bottom 36 of the depression 32 and the second face 52 of the cradle base 44 is positioned towards the bottom 36 of the depression 32 (step 202). The shelf 54 is positioned between the bottom 36 of the depression 32 and the tab 38 extending outward from the sidewall 34 of the depression 32 into the depression 32 (step 204).

Then, the second side 48 of the cradle base 44 is moved into the depression 32 such that (1) the cradle base 44 is positioned into the depression 32 and is beneath the upper surface 30 of the floor 28 of the tray 22, (2) the protrusion 56 extending from the second side 48 of the cradle base 44 is received into the slot 40 in an opposing sidewall 34 of the depression 32, and (3) each of the plurality of axially aligned 78 slots extending from the first face 50 of the cradle base 44 are positioned over the depression 32 (step 206).

Correspondingly, to remove the cradle 42 and the cradle base 44 from the depression 32, the portion 64 of the second side 48 of the cradle base 44 is flexed towards the passage 58 to disengage the protrusion 64 from the slot 40, and the second side 48 of the cradle base 44 and then the first side of the cradle base 44 are lifted out of the depression 32 to dismount the cradle base 44 from the depression 32.

To perform step 204, one may slide the first side 46 of the cradle base 44 along the floor 28 of the depression 32 to position the shelf 54 beneath the tab 38. Thus, step 202 may include a downward movement of the first side 46 of the cradle base 44, and step 204 may include a horizontal movement of the first side 46 of the cradle base 44 within the depression 32. As discussed above, this arrangement can safely move fibers 138 in the channels 94a-b out of the way when mounting the cradle base 44 in the depression 32 (see FIGS. 2a-c), without inflicting damage on the fibers 138. Thus, using this method, the cradles 42 can be safely removed from and inserted into the tray 22 while fibers 138 reside within the tray 22.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A modular assembly for supporting fiber optic splices, comprising:
    a tray including a floor, sidewalls that extend upward from the floor, a depression in the floor, the depression having sidewalls that extend downward from an upper surface of the floor to a bottom of the depression, and a tab that extends outward from one of the depression sidewalls and into the depression, the tab being spaced away from the bottom of the depression;
    a cradle including a base configured to mount in the depression, the cradle base having first and second opposing sides and also having a first face positioned away from the bottom of the depression and an opposite second face positioned towards the bottom of the depression when the cradle is mounted in the depression, the cradle including a shelf recessed into the first face and positioned on the first side of the cradle base, the shelf being positioned between the bottom of the depression and the tab when the cradle base is mounted in the depression, wherein an area of the cradle base is smaller than or equal to an area of the depression to enable the cradle base to mount in the depression; and
    a splice holder mounted to the first face of the cradle base and defining a plurality of slots, each of the slots being sized to receive fiber optic splices, and each of the slots being positioned over the depression when the cradle base is mounted in the depression.

2. The modular assembly of claim 1, wherein the second face of the cradle base is flat and is parallel with the bottom of the depression.

3. The modular assembly of claim 1, wherein the first face of the cradle base is flush with or recessed below the upper surface of the floor when the cradle base is mounted in the depression.

4. The modular assembly of claim 1, wherein the first and second faces of the cradle base are parallel to each other and are perpendicular to the sidewalls of the tray.

5. The modular assembly of claim 1, wherein the tray further comprises an additional tab extending outward into the depression from an opposite sidewall of the other tab, and wherein the cradle further comprises an additional shelf recessed into the first face and positioned on the second side of the cradle base, at least a portion of the additional shelf being positioned between the bottom of the depression and the additional tab when the cradle base is mounted in the depression.

6. The modular assembly of claim 1, further comprising:
    a lip extending outwards from one of the depression sidewalls, the lip being adjacent to the second side of the cradle base when the cradle base is mounted in the depression;
    a protrusion that extends outward from the second side of the cradle base and is positioned between the bottom of the depression and the lip when the cradle base is mounted in the depression; and
    a passage extending between the first and second faces of the cradle base along the second side of the cradle base and having an elongated profile including rounded ends and a narrowed center portion, the passage permitting a portion of the cradle base between the protrusion and the passage to flex and bias the protrusion away from the lip to remove the cradle from the depression.

7. The modular assembly of claim 1, wherein the plurality of slots includes first and second columns of slots that are horizontally spaced apart between the first and second sides of the cradle base and are arranged in a parallel configuration so that the slots of the first column vertically align with the slots of the second column above the cradle base.

8. The modular assembly of claim 1, wherein the splice holder comprises:
    a splice holder base having a first face positioned away from the first face of the cradle base and an opposite second face positioned towards the first face of the cradle base; and
    a plurality of parallel spaced apart members extending from the first face of the splice holder to define the plurality of slots therebetween;
    wherein each member includes on at least one side a first concave groove proximate to the splice holder base, and a second concave groove spaced away from the slice holder base, the concave grooves being separated by a ridge that is axially aligned with the grooves; and
    wherein each of the plurality of slots includes a first passage defined by opposing first concave grooves and a second passage defined by opposing second concave grooves, each of said passages being sized to receive a fiber optic splice.

9. The modular assembly of claim 8, wherein a plurality of the members of the splice holder also include:
    a first relief passage adjacent to the first concave groove on the at least one side of the member; and
    a second relief passage adjacent to the second concave groove on the at least one side of the member, each of the relief passages being axially aligned with the grooves, each of the relief passages permitting expansion of their adjacent first or second passage via lateral deformation of their respective adjacent first or second concave groove.

10. The modular assembly of claim 8, wherein the cradle further comprises arms extending upwards from the first face of the cradle base at the first and second sides of the cradle base, wherein each arm includes a cradle tab, the cradle tabs extending towards each other over the cradle base, and wherein the splice holder is positioned between the arms so that each cradle tab extends into an opposite side of the splice holder, to mount the splice holder to the first face of the cradle base.

11. The modular assembly of claim 1, wherein the depression is a first depression and the cradle is a first cradle, and wherein the unit further comprises a second cradle configured to mount in a second depression in the floor of the tray, a base of the second cradle having an area that is smaller than or equal to an area of the second depression, and wherein the cradles and depressions are arranged to form a first fiber channel between a first of the tray sidewalls and the first cradle, a second fiber channel between the first and second cradles, and a third fiber channel between the second cradle and a second of the tray sidewalls that is opposite the first sidewall.

12. The modular assembly of claim 11, wherein the second cradle and the second depression have substantially identical shapes and sizes to the first cradle and the first depression respectively.

13. The modular assembly of claim 1, wherein the tray further comprises a neck defined by a neck base and opposing neck sidewalls extending upwards from the neck base, the neck extending outwards from one of the sidewalls of the tray, the neck defining a channel that is in communication with a central section of the tray defined by the floor and sidewalls of the tray, and the neck sidewalls being notched to receive a surrounding tie for securing fibers extending from the central section through the channel of the neck.

14. The modular assembly of claim 1, wherein the tab is a first tab, the unit further comprising a plurality of second tabs extending from the sidewalls of the tray over the floor of the tray to retain fibers within the tray.

15. The modular assembly of claim 1, further comprising a hinge configured to attach the tray to a frame, the hinge defining two spaced apart and parallel hinge axes, the tray being configured to pivot with respect to the hinge about a first of the two axes, and the hinge being configured to pivot with respect to the frame about a second of the two axes.

16. A modular assembly for supporting fiber optic splices, comprising:
a tray having a floor, a depression in the floor having sidewalls that extend downward from an upper surface of the floor to a bottom of the depression, and a tab that extends outward from one of the depression sidewalls and into the depression;
a cradle including a base configured to be seated in the depression, the cradle base having a first face positioned away from the bottom and an opposite second face positioned towards the bottom when the cradle base is seated in the depression, an area of the base being smaller than or equal to an area of the depression to enable the cradle base to be seated in the depression, the cradle base including a shelf recessed into the first face at the first side of the cradle base, the shelf being positioned between the bottom of the depression and the tab when the cradle base is seated in the depression; and
a splice holder mounted to the first face of the cradle base and defining a plurality of slots, wherein each of the plurality of slots is positioned over the depression and is sized to receive fiber optic splices.

17. The modular assembly of claim 16, wherein the splice holder comprises a plurality of parallel, spaced apart members extending upwards away from the first face of the cradle base to define the plurality of slots therebetween, wherein each member includes on at least one side a first concave groove proximate to the cradle base, and a second concave groove spaced away from the cradle base, the concave grooves being separated by a ridge, and wherein each of the plurality of slots includes a first passage formed by opposing first concave grooves and a second passage formed by opposing second concave grooves, each of said passages being sized to receive a fiber optic splice.

18. A method of securing a cradle for supporting fiber optic splices to a modular tray, the cradle including a cradle base having first and second opposing faces and first and second opposing sides, the method comprising:
moving a first side of the cradle base into a depression in a floor of the tray such that the first face of the cradle base is positioned away from a bottom of the depression and the second face of the cradle base is positioned towards the bottom of the depression;
positioning a shelf recessed into the first face at the first side of the cradle base between the bottom of the depression and a tab extending outward from a sidewall of the depression into the depression; and
moving the second side of the cradle base into the depression such that the cradle base is positioned into the depression and is beneath the an upper surface of the floor of the tray, a protrusion extending from the second side of the cradle base is received into a slot in a sidewall of the depression, and each of a plurality of axially aligned slots extending from the first face of the cradle base and are positioned over the depression.

19. The method of claim 18, the method further comprising seating the cradle base into the depression such that an area of the cradle base is smaller than or equal to an area of the depression.

20. The method of claim 18, wherein the cradle base includes a passage that extends between the first and second faces of the cradle along the second side of the cradle base, the method further comprising:
flexing a portion of the second side of the cradle base adjacent to the protrusion towards the passage to disengage the protrusion from the slot; and
lifting the second side and then the first side of the cradle base out of the depression to dismount the cradle base from the depression.

* * * * *